United States Patent [19]

Kato et al.

[11] Patent Number: 4,525,547

[45] Date of Patent: Jun. 25, 1985

[54] PROCESS FOR PRODUCING ETHYLENE COPOLYMER BY GASEOUS PHASE COPOLYMERIZATION

[75] Inventors: Akifumi Kato, Ohtake; Junichi Yoshida, Iwakuni; Ryoichi Yamamoto, Waki, all of Japan

[73] Assignee: Mitsui Petrochemical Industries Ltd., Tokyo, Japan

[21] Appl. No.: 594,957

[22] Filed: Apr. 2, 1984

Related U.S. Application Data

[63] Continuation of Ser. No. 497,439, May 27, 1983, abandoned, which is a continuation of Ser. No. 310,925, Oct. 13, 1981, abandoned.

[30] Foreign Application Priority Data

Oct. 15, 1980 [JP] Japan ................... 55-142938

[51] Int. Cl.$^3$ ............................................... C08F 2/34
[52] U.S. Cl. .......................................... 526/68; 526/70
[58] Field of Search ............................... 526/68, 70

[56] References Cited

U.S. PATENT DOCUMENTS

| | | | |
|---|---|---|---|
| 3,912,698 | 10/1975 | Shurts | 526/68 |
| 3,971,768 | 7/1976 | Peters | 526/68 |
| 4,129,701 | 12/1978 | Jezl | 526/68 |
| 4,168,356 | 9/1979 | Levresse | 526/68 |
| 4,258,158 | 3/1981 | Pfeiffer | 526/70 |

*Primary Examiner*—Paul R. Michl
*Attorney, Agent, or Firm*—Sherman & Shalloway

[57] ABSTRACT

A process for producing an ethylene copolymer which comprises polymerizing a predominant amount of ethylene and a minor amount of an alpha-olefin having 4 to 10 carbon atoms in the gaseous phase in the presence of a catalyst composed of (A) a transition metal catalyst component and (B) an organometallic compound of a metal of Groups I to III of the periodic table; characterized in that the copolymerization is carried out under the following conditions (i) and (ii), (i) at least 1 mole, per mole of ethylene, of a gaseous saturated hydrocarbon having 3 to 6 carbon atoms is caused to be present in the gaseous phase copolymerization system, and (ii) the gaseous mixture containing the unreacted olefin which has been discharged from the gaseous phase copolymerization system is cooled to a temperature at which the mixture is not liquefied, and the cooled gaseous mixture is recycled to the gaseous phase copolymerization system.

5 Claims, No Drawings

4,525,547

PROCESS FOR PRODUCING ETHYLENE COPOLYMER BY GASEOUS PHASE COPOLYMERIZATION

This application is a continuation of application Ser. No. 497,439 filed May 27, 1983, now abandoned which in turn is a continuation of application Ser. No. 310,925 filed Oct. 13, 1981, now abandoned.

This invention relates to a process for producing an ethylene copolymer by the gaseous phase polymerization method. More specifically, it pertains to a process for producing an ethylene copolymer by gaseous phase copolymerization of ethylene with an alpha-olefin having 4 to 10 carbon atoms. According to this invention, sufficient heat removal can be achieved without the need to increase the partial pressure of the alpha-olefin. The process of the invention can also achieve various improvements, for example the prevention of polymer deposition on the reactor wall, the prevention of lumpy polymer formation, the uniform proceeding of the polymerization reaction, the enhanced copolymerization activity of the catalyst, and the improved bulk density of the copolymer.

More specifically, this invention relates to a process for producing an ethylene copolymer which comprises polymerizing a predominant amount of ethylene and a minor amount of an alpha-olefin having 4 to 10 carbon atoms in the gaseous phase in the presence of a catalyst composed of (A) a transition metal catalyst component and (B) an organometallic compound of a metal of Groups I to III of the periodic table; characterized in that the copolymerization is carried out under the following conditions (i) and (ii), (i) at least 1 mole, per mole of ethylene, of a gaseous saturated hydrocarbon having 3 to 6 carbon atoms is caused to be present in the gaseous phase copolymerization system, and (ii) the gaseous mixture containing the unreacted olefin which has been discharged from the gaseous phase copolymerization system is cooled to a temperature at which the mixture is not liquefied, and the cooled gaseous mixture is recycled to the gaseous phase copolymerization system.

It has previously been known to polymerize or copolymerize olefins in the gaseous phase in the presence of a catalyst composed of a transition metal catalyst component and an organometallic compound of a metal of Groups I to III of the periodic table. In performing the gaseous phase polymerization or copolymerization of olefins, it is the usual practice, for example, to use a polymerization vessel having a fluidized bed or an agitated fluidized bed and polymerize or copolymerize the olefins while floating and fluidizing the catalyst and the resulting polymer or copolymer with a gaseous olefin. This procedure has the advantage that contacting of the olefins with the catalyst is good, and the operation is simple.

It is known however that in such a gaseous phase polymerization or copolymerization of olefins, the flow rate of a gaseous stream in the polymerization vessel is limited in order to prevent the trouble of entrainment, and the flow rate of the gas cannot be increased too much.

On the other hand, in gaseous phase polymerization or copolymerization, one of the important problems to be solved is how to remove the heat of polymerization with good efficiency in a reaction zone of the polymerization system. Various means are known which attempt at solving this problem. One means involves cooling the unreacted olefin gas discharged from the gaseous phase polymerization zone by a cooler provided externally of the polymerization vessel and recycling the cooled gas to the gaseous phase polymerization system. Another means comprises polymerizing or copolymerizing olefins in the copresence of an easily volatile inert hydrocarbon, maintaining the inert hydrocarbon in the vaporized state in the gaseous phase polymerization or copolymerization system, cooling the gaseous mixture containing the unreacted olefin and discharged from the polymerization or copolymerization system by means of an external cooler to liquefy it, and recycling the liquefied gaseous mixture to the gaseous phase polymerization or copolymerization system. It is difficult, however, to get satisfactory results from these means.

The first-mentioned means utilizes sensible heat, and a fairly large amount of the unreacted olefin gas must be recycled. Otherwise, the heat of polymerization could not be satisfactorily removed. In addition, because of the aforesaid restriction that the flow rate of the gas in the polymerization vessel cannot be increased too much in order to prevent entrainment in the gaseous phase polymerization or copolymerization, the operation must be carried out at a fairly high pressure in order to remove the heat of polymerization by the aforesaid means without involving the inconvenience of unduly increasing the scale of the polymerization vessel. Furthermore, when the first-mentioned means is applied to the gaseous phase copolymerization of ethylene and an alpha-olefin having at least 4 carbon atoms such as 1-hexene, at least a part of the alpha-olefin having at least 4 carbon atoms inevitably undergoes liquefaction during the cooling of the unreacted olefin gas with the external cooler. If such a cooled olefin gas is recycled to the polymerization vessel, non-uniform copolymerization reaction tends to take place so that a copolymer of high quality cannot be obtained.

Since the latter means utilizes latent heat, it produces a good effect of removing heat. However, feeding of the easily volatile inert hydrocarbon in the cooled liquid state to the polymerization vessel causes a trouble. For example, when this means is applied to gaseous phase copolymerization of ethylene with an alpha-olefin having at least 4 carbon atoms such as 1-hexene, the alpha-olefin having at least 4 carbon atoms is fed to the polymerization vessel while it is being taken into the liquid phase of the inert hydrocarbon. Consequently, non-uniform copolymerization also tends to take place so that a copolymer of high quality cannot be obtained.

The present inventors have extensively worked in order to provide a process for producing an ethylene copolymer by gaseous phase polymerization of ethylene with an alpha-olefin having 4 to 10 carbon atoms, by which the copolymerization in the gaseous phase can be performed smoothly without the aforesaid troubles and the excellent effect of heat removal and the uniformity of the reaction can be achieved.

They have consequently found that by copolymerizing a predominant amount of ethylene and a minor amount of an alpha-olefin having 4 to 10 carbon atoms in the gaseous phase in the presence of a catalyst composed of (A) a transition metal catalyst component and (B) an organometallic compound of a metal of Groups I to III of the periodic table under the aforesaid conditions (i) and (ii) in combination, the heat of copolymerization can be removed sufficiently and effectively without the need to increase the partial pressure of the alpha-olefin unduly, and the trouble of non-uniform copolymerization reaction incident to the cooling and liquefaction of the alpha-olefin for heat removal can be avoided.

It has also been found that by performing the aforesaid gaseous phase copolymerization under the combination of the conditions (i) and (ii), there can be achieved quite unexpected results, for example the increase of the polymerization activity of the catalyst, the improvement of the bulk density of the copolymer, the reduced polymer deposition on the inner wall of the polymerization vessel, the prevention of lumpy polymer formation, and the proceeding of uniform copolymerization reaction. The inventors have also discovered that even when the partial pressure of the alpha-olefin having a large carbon number is relatively low, the content of the alpha-olefin in the copolymer can be increased.

It is an object of this invention therefore to provide an improved process for polymerizing ethylene with an alpha-olefin having 4 to 10 carbon atoms in the gaseous phase.

The above and other objects of this invention will become more apparent from the following description.

The transition metal catalyst component (A) used in the practice of the process of this invention is a compound of a transition metal such as titanium, vanadium, chromium or zirconium, which may be liquid or solid under conditions of use. It needs not to be a single compound, and may be supported on, or mixed with, another compound. Or it may be a complex with another compound. A highly active transition metal catalyst component capable of forming at least about 5000 g, especially at least about 8000 g, of an olefin polymer per millimole of the transition metal is suitable as the component (A). A typical example is a highly active titanium catalyst component activated with a magnesium compound. A specific example is a solid titanium catalyst component which contains titanium, magnesium and halogen as essential ingredients and an amorphous magnesium halide and which has a specific surface area of at least from 40 $m^2/g$, preferably about 80 to about 800 $m^2/g$. It may contain an electron donor such as an organic acid ester, a silicic acid ester, an acid halide, an acid anhydride, a ketone, an acid amide, a tertiary amine, an inorganic acid ester, a phosphoric acid ester, a phosphorous acid ester or an ether. Preferably, this catalyst component contains about 0.5 to about 15% by weight, especially about 1 to about 8% by weight, of titanium with the titanium/magnesium atomic ratio being from about 1/12 to about 1/100, especially from about $\frac{1}{3}$ to about 1/50, the halogen/titanium atomic ratio being from about 4 to about 100, especially from about 6 to about 80, and the electron donor/titanium mole ratio being from zero to about 10, especially from 0 to about 6.

Many proposals have been made on these transition metal catalyst components, and all of the previously proposed components can be used in this invention. Examples of such known titanium catalyst components include those described in U.S. Pat. Nos. 4,157,435; 4,076,924; 4,226,741; 4,277,589; 4,069,169; 4,085,276; and 4,232,139; British Pat. No. 1,552,728 and German Laid-open Patent Application No. 3,022,738.

Examples of the catalyst component (B), which is an organometallic compound (a compound having a metal-carbon bond) of a metal of Groups I to III of the periodic table, as the other catalyst component include organic compounds of alkali metals, organic compounds of alkaline earth metals, and organoaluminum compounds. Specific examples of these are alkyl lithiums, aryl sodiums, alkyl magnesiums, aryl magnesiums, alkyl magnesium halides, aryl magnesium halides, alkyl magnesium hydrides, trialkyl aluminums, dialkylaluminum monohalides, alkylaluminum sesquihalides, alkylaluminum dihalides, alkylaluminum hydrides, alkylaluminum alkoxides, alkyllithium aluminums, and mixtures of these.

In addition to the components (A) and (B), the catalyst may also contain an electron donor catalyst component, such as an organic acid ester, a silicic acid ester, a carboxylic acid halide, a carboxylic acid amide, a tertiary amine, an acid anhydride, an ether, a ketone, an aldehyde or a halogenated hydrocarbon. The electron donor may be used as a complex (or addition compound) with the organometallic compound (B), or with another compound such as a Lewis acid (e.g., an aluminum trihalide).

Examples of the minor amount of the alpha-olefin having 4 to 10 carbon atoms, preferably 5 to 10 carbon atoms, to be copolymerized with ethylene include 1-butene, 1-pentene, 1-hexene, 1-heptene, 1-octene, 1-nonene, 1-decene, 3-methyl-1-butene, 3-methyl-1-pentene, 4-methyl-1-pentene, 4,4-dimethyl-1-pentene, 5-methyl-1-heptene, and mixtures of two or more of these olefins.

The process of this invention can be used especially preferably when producing a resinous copolymer having an ethylene content of about 75 to about 99.9 mole%, especially about 85 to about 99 mole%. The copolymer in accordance with this invention may further contain a minor proportion of another comonomer such as a polyene.

The process of this invention is characterized by the fact that a combination of parameters (i) and (ii) is satisfied in the production of an ethylene copolymer by copolymerizing a predominant amount of ethylene and an alpha-olefin having 5 to 10 carbon atoms in the presence of the aforesaid catalyst.

Desirably, prior to the performance of the gaseous phase copolymerization by the process of this invention, the transition metal catalyst component (A) is subjected to a polymerization or copolymerization treatment with a small amount of an olefin (such as ethylene, propylene or the other exemplified alpha-olefins having 4 to 10 carbon atoms) in the presence of a part or the whole of the organometallic compound (B) used in the gaseous phase copolymerization.

The pre-polymerization treatment may be carried out in any atmosphere, but preferably in a liquid medium composed of the $C_3-C_6$ saturated hydrocarbon used in the gaseous phase polymerization. The extent of effective prepolymerization is such that about 0.1 to about 150 g of a polymer of the olefin is formed per millimole of the transition metal if the aforesaid highly active transition metal catalyst component is used. The pre-polymerization treatment serves to inhibit formation of a fine powdery copolymer, increase the bulk density of the copolymer, improve the fluidizability of the powder, increase the activity of the catalyst, etc. When the pre-polymerization treatment is to be carried out by a continuous method, it can be carried out in any of a complete mixing type reactor and a piston flow-type reactor. To prevent the "short pass" of the catalyst (i.e., the insufficient residence of the catalyst in the reactor), however, the use of the piston flow-type reactor is preferred.

A fluidized bed reactor, an agitated fluidized bed reactor, etc. are preferably used in performing the gaseous phase copolymerization in accordance with this invention.

In the process of this invention, the mole ratio of ethylene to the $C_4$–$C_{10}$ alpha-olefin is preferably 1:0.001–0.4, especially preferably 1:0.01–0.25.

The gaseous phase copolymerization of the process of the invention is first characterized in that it is carried out in the copresence of at least about 1 mole, per mole of ethylene, of a gaseous saturated hydrocarbon having 3 to 6 carbon atoms [the condition (i)]. The amount of the $C_3$–$C_6$ saturated hydrocarbon is preferably 1 to 100 moles, more preferably 1 to 20 moles, per mole of ethylene. Examples of the saturated hydrocarbon used in this invention include propane, butane, isobutane, n-pentane, isopentane, cyclopentane, n-hexane and isohexane, saturated hydrocarbons having 3 or 4 carbon atoms are preferred. From the viewpoint of the ease of separation, the saturated hydrocarbon is preferably the one having a different number of carbon atoms from the alpha-olefin having 4 to 10 carbon atoms used in the copolymerization process. More preferably, the saturated hydrocarbon has a smaller number of carbon atoms than the $C_4$–$C_{10}$ alpha-olefin used in the copolymerization because such a saturated hydrocarbon is not likely to be liquefied at the time of cooling under the condition (ii). For example, the use of propane ($C_3$) is preferred.

The use of an inert gas such as nitrogen instead of the saturated hydrocarbon is not preferred because it has a low specific heat and must be used in a great quantity, and moreover it is not easily separable from ethylene.

The polymerization temperature is below the melting point of the copolymer formed, preferably at least about 10° C. lower than the melting point of the copolymer, more preferably from room temperature to about 130° C., especially preferably from about 50° to about 110° C.

The partial pressure of the $C_4$–$C_{10}$ alpha-olefin may be any pressure at which the alpha-olefin does not undergo liquefaction in the gaseous phase copolymerization system or in a system in which the gaseous mixture containing the unreacted olefin is cooled. However, because excessively low partial pressures retard the rate of copolymerization, the partial pressure of the alpha-olefin is preferably about 0.1 to about 20 kg/cm² gauge.

For molecular weight adjustment, hydrogen may also be caused to be present in the copolymerization system. The amount of hydrogen used is, for example, not more than about 20 moles per mole of ethylene.

The total pressure of the gaseous phase copolymerization is, for example, 1 to 100 kg/cm².G, preferably 1 to 30 kg/cm².G.

When the aforesaid transition metal catalyst component, organometallic compound and optionally electron donor catalyst component are used in accordance with one preferred embodiment of the process of the invention, it is preferred that the amount of the transition metal catalyst component be about 0.0005 to about 1 millimole, especially about 0.001 to about 0.5 millimole, calculated as the transition metal atom, per liter of the volume of the fluidized reaction bed; the amount of the organometallic compound be such that the atomic ratio of the metal in the organometallic compound to the transition metal is from about 1 to about 2000, especially from about 1 to about 500; and the amount of the electron donor catalyst component be 0 to about 1 mole, especially 0 to about 0.5 mole, per mole of the organometallic compound.

These components may be fed to the gaseous phase copolymerization system after they are diluted with an alpha-olefin or an inert solvent. Or they may be used after the pre-polymerization treatment described hereinabove. Even if a liquid diluent is present, these components may be supplied as such to the gaseous phase copolymerization system. Preferably, however, they are fed after the diluent is gasified by heating, etc.

When a fluidized bed or an agitated fluidized bed is used, the flow rate of a gas which passes through the bed is preferably about 2 Umf to about 10 Umf. The Umf is the minimum rate of fluidization.

The process of the invention is further characterized by the fact that the gaseous mixture containing unreacted olefin which is discharged from the gaseous phase copolymerization system is then cooled in a cooler to a temperature at which it does not undergo liquefaction, and the cooled gaseous mixture is then recycled to the copolymerization system [condition (ii)]. The cooling temperature should be lower than the temperature of the copolymerization system, for example about 0° to about 60° C.

The resulting copolymer is withdrawn continuously or intermittently from the reaction bed so that the volume of the reaction bed is maintained constant. When the gaseous phase copolymerization is carried out in one stage, the withdrawn copolymer is separated from the gases, and if desired subjected to an after-treatment such as pelletization to obtain a final product. When it is carried out in a multiplicity of stages, the withdrawn copolymer is supplied to a second polymerization system where the copolymerization is continued in a manner similar to that in the first copolymerization system.

The present invention contemplates production of a copolymer, and can of course be applied to the production of ethylene/$C_4$–$C_{10}$ copolymers in a multiplicity of stages to provide a composition consisting of a homopolymer and a copolymer. For example, the process of the invention can be utilized when a homopolymer is first formed in an amount much larger than a polymer formed by pre-polymerization, and then ethylene and a $C_4$–$C_{10}$ alpha-olefin are copolymerized in the gaseous phase in the presence of the homopolymer formed.

The following examples illustrate the present invention more specifically.

EXAMPLE 1

[Synthesis of a catalyst]

A 200 ml flask was charged with 4.8 g of anhydrous $MgCl_2$, 15 ml of decane and 18 ml of 2-ethylhexanol, and they were reacted at 120° C. for 2 hours to form a uniform solution. Then, 0.84 ml of ethyl benzoate was added to the solution.

Titanium tetrachloride (200 ml) was put in a 400 ml flask and while it was cooled at 0° C., all the uniform solution obtained as above was added dropwise over the course of 1 hour. The temperature was then raised to 80° C., and the mixture was stirred at 80° C. for 2 hours. The solid portion was collected by filtration, and suspended in 200 ml of titanium tetrachloride freshly supplied. The mixture was stirred at 90° C. for 2 hours. After the stirring, the solid portion was collected by hot filtration, and washed fully with hot kerosene and hexane to give a titanium catalyst component which contained 4.8% by weight of Ti, 59% by weight of Cl and 18% by weight of Mg and had an average particle diameter of 4.0 microns and a specific surface area of 248 m²/g.

[Pre-treatment of the catalyst]

The resulting titanium catalyst component was dried, and then suspended in propane in a concentration of 0.5 millimole per liter as Ti. It was pre-treated at 40° C. by feeding triisobutyl aluminum (500 millimoles/liter) and 3 g of propylene per gram of the titanium catalyst component. Then, a tubular reactor equipped with a stirrer and having an inside diameter of 30 cm and a length of 200 cm was charged hourly with 0.5 millimole as Ti of the titanium catalyst component, 5 millimole of triisobutyl aluminum and 15 liters of propane, and ethylene and 1-hexene were fed at a rate of 45 g/hr, and 15 g/hr, respectively and pre-polymerized continuously at 50° C. and 17 kg/cm².G. There was formed 100 g of a polymer having a density of 0.920 g/cc per millimole of Ti.

[Polymerization]

The catalyst subjected to the above pre-polymerization treatment was flushed through, and fed into, a fluidized bed reactor having a diameter of 300 mm (the volume of the reaction zone: 30 liters), and propane, ethylene, 1-hexene and hydrogen were fed into it. The gaseous mixture discharged from the top of the reaction bed was cooled by a cooler to 40° C., then heated to 65° C., and recycled to the bottom of the reactor.

The copolymerization was carried out at a temperature of 80° C., a pressure of 10 kg/cm².G, and a superficial velocity in reactor of 30 cm/sec. The mole ratio of propane to ethylene was maintained at 3.5, and the mole ratio of hydrogen to ethylene, at 0.4. In order to maintain the height of the reaction bed substantially constant, the polymer was intermittently withdrawn to give an ethylene copolymer having a density of 0.930 g/cc, a melt flow index (MI) of 0.95, a bulk density of 0.43 g/cc and an average particle diameter of 350 microns at a rate of 10 kg/hr.

When the process was continuously operated for 150 hours by the above procedure, no trouble occurred. After 150 hours, the equipment used was inspected. There was a trace of polymer deposited partly in a recycle gas piping. The other devices including the cooler were found to be very clean.

COMPARATIVE EXAMPLE 1

The same polymerization as in Example 1 was carried out except that propane was not supplied and the catalyst subjected to the pre-polymerization treatment was used after drying. Since a part of the 1-hexene condensed when the gaseous mixture containing the unreacted olefin was cooled to 40° C., the condensed 1-hexane was separated. The remaining gaseous portion was heated to 70° C. and recycled to the bottom of the reactor. On the other hand, the condensed 1-hexane was recycled while spraying it from the top of the reactor.

The morphological properties of the polymer powder were poor, and large amount of it deposited on the reactor wall. The stable operation failed after the lapse of 8 hours from the starting.

EXAMPLES 2 TO 4 AND COMPARATIVE EXAMPLE 2

The same titanium catalyst component as in Example 1 was pre-treated with propylene in hexane in the same way as in Example 1, and dried. The dried titanium catalyst component and triisobutyl aluminum were fed at a rate of 5 millimoles/hr. The partial pressure of ethylene was maintained at 2 kg/cm². The mole ratio of 1-hexene to ethylene was maintained at 0.04, and the mole ratio of hydrogen to ethylene, at 0.4. The rate of propane fed was changed as shown in Table 1. Otherwise, the same copolymerization as in Example 1 was carried out.

The amount of the catalyst and ethylene were adjusted so as to give the copolymer at a rate of 10 kg/hr.

The results are shown in Table 1.

TABLE 1

| | Ethylene/propylene mole ratio | Catalyst activity (g of polymer/mmole of Ti) | Properties of the polymer | | | Deposition of the polymer on the reactor wall |
|---|---|---|---|---|---|---|
| | | | Bulk density (g/cc) | Density (g/cc) | MI | |
| Ex. 2 | 1:3 | 20000 | 0.45 | 0.940 | 1.5 | almost no |
| Ex. 3 | 1:1.5 | 15000 | 0.40 | 0.940 | 2.0 | almost no |
| Ex. 4 | 1:0.3 | 10000 | 0.35 | 0.943 | 1.9 | slight |
| CEx. 2 | 1:0 | 8000 | 0.33 | 0.946 | 2.5 | much |

EXAMPLE 5

The same titanium catalyst component as in Example 1 was suspended in isopentane, and in the same way as in Example 1, propylene was polymerized at 45° C. to an extent of 20 g per gram of the catalyst component.

The same reactor as used in Example 1 was charged with 0.8 mmole as Ti of the above treated titanium catalyst component per hour, and 10 mmoles of triethyl aluminum per hour. Furthermore, ethylene, 1-butene, hydrogen and isopentane were fed into the reactor. The mole ratio of 1-butene to ethylene was maintained at 0.21; the mole ratio of isopentane to ethylene, at 1.5; and the mole ratio of hydrogen to ethylene, at 0.5.

The copolymerization was carried out at a temperature of 70° C., a pressure of 7 kg/cm².G and a superficial velocity in a reactor of 35 cm/sec. The gaseous mixture discharged from the top of the reaction bed was cooled by a cooler to 60° C., and recycled to the bottom of the reactor. The polymer was intermittently withdrawn to give an ethylene copolymer having a density of 0.923 g/cc, a bulk density 0.48 g/cc, an MI of 3.1 and an average particle diameter of 290 microns. The process was operated for 2 days by the above procedure. No trouble occurred.

What we claim is:

1. In a gaseous phase polymerization process for producing an ethylene copolymer having a density of from about 0.923 to about 0.943 g/cc which comprises polymerizing a predominant amount of ethylene and a minor amount of an alpha-olefin having 4 to 10 carbon atoms at a temperature of from room temperature to about 130° C. and below the melting point of the copolymer formed and a pressure of from 1 to 100 kg/cm².G in the presence of a catalyst composed of (A) a transition metal catalyst component and (B) an organometallic compound of a metal of Groups I to III of the periodic table; the improvement wherein the copolymerization is carried out under the following conditions (i) and (ii),
   (i) at least 1 mole, per mole of ethylene, of a gaseous saturated hydrocarbon having 3 to 6 carbon atoms is caused to be present in the gaseous phase copolymerization system, and
   (ii) the gaseous mixture containing the unreacted olefin which has been discharged from the gaseous phase copolymerization system is cooled to a temperature at which the mixture is not liquefied, and the cooled gaseous mixture is recycled to the gaseous phase copolymerization system.

2. The process of claim 1 wherein the saturated hydrocarbon has a different number of carbon atoms from the alpha-olefin having 4 to 10 carbon atoms used in the copolymerization.

3. The process of claim 1 wherein the saturated hydrocarbon has a smaller number of carbon atoms than the alpha-olefin having 4 to 10 carbon atoms used in the copolymerization.

4. The process of claim 1 wherein the mole ratio of ethylene to the alpha-olefin is 1:0.001–0.4.

5. The process of claim 1 wherein the mole ratio of ethylene to the saturated hydrocarbon having 3 to 6 carbon atoms is 1:1–100.

* * * * *